(12) United States Patent
Wong

(10) Patent No.: US 6,700,254 B2
(45) Date of Patent: Mar. 2, 2004

(54) MOTOR CASING

(75) Inventor: Ben To Fan Wong, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 32 days.

(21) Appl. No.: 10/077,974

(22) Filed: Feb. 20, 2002

(65) Prior Publication Data
US 2002/0113506 A1 Aug. 22, 2002

(30) Foreign Application Priority Data
Feb. 21, 2001 (GB) .............................. 0104212

(51) Int. Cl.[7] ................................................. H02K 5/00
(52) U.S. Cl. ................................. 310/89; 310/40 MM
(58) Field of Search ..................... 310/89, 40 MM, 310/43

(56) References Cited

U.S. PATENT DOCUMENTS

| 2,701,318 A | * | 2/1955 | Feiertag | 220/315 |
| 3,600,615 A | * | 8/1971 | Morita | 310/154.37 |
| 3,732,616 A | * | 5/1973 | Masrrodonato et al. | 29/510 |
| 4,644,204 A | * | 2/1987 | Lakin | 310/42 |
| 5,034,640 A | * | 7/1991 | Shimizu | 310/238 |

FOREIGN PATENT DOCUMENTS

| EP | 0 305 915 A1 | 3/1989 |
| EP | 0 544 222 A1 | 11/1992 |
| FR | 2 723 491 | 2/1996 |
| FR | 2 726 700 | 5/1996 |
| GB | 1226243 | 3/1969 |
| GB | 1 296 429 | 11/1970 |
| GB | 2 134 327 A | 1/1984 |

* cited by examiner

Primary Examiner—Nicholas Ponomarenko
Assistant Examiner—Nguyen Hanh
(74) Attorney, Agent, or Firm—Birch, Stewart, Kolasch & Birch, LLP

(57) ABSTRACT

A connection between a tubular housing 10 and an end cap 20 of a miniature electric motor is made tight by using a circumferentially extending finger 16 on the housing which is bent radially to engage a lip 32 in a recess 30 in the end cap 20 whereby radial deformation of the finger 16 causes an axial clamping of the end cap 20 to the housing 10 without any separation caused by spring back of the finger 16 following deformation.

15 Claims, 2 Drawing Sheets

MOTOR CASING

FIELD OF THE INVENTION

This invention relates to miniature electric motors and in particular, to the housing for a miniature motor.

DESCRIPTION OF THE PRIOR ART

Miniature motors vary in size and with small miniature motors, the material of the rear housing part is relatively thin, allowing an end cap or bearing plate to be secured to the rear housing by crimping the rear housing. This crimping process may involve bending over an axially extending finger cut from the edge of the rear housing or simply deforming discrete parts of the edge of the rear housing.

As the size and power of the motor increases, it is also desirable to increase the thickness of the rear housing as it forms the magnetic flux return path for the stator.

However, as the thickness of the rear housing increases so does the power required to crimp the end plates to the metal housing. The metal also exhibits resilience so that when the cut finger crimping method is used with a thick wall housing, say in the order of 2 mm, the finger springs back slightly. While the end cap is still captured by the finger, it is not held firmly against the metal housing resulting in play or movement between the metal housing and the end cap.

Another method used is to cut holes in the housing so as to form pairs of opposing circumferentially extending fingers. Sometimes the fingers may be joined together. The end plate is crimped to the housing by radially deforming the fingers over a crimping surface of the end cap thereby preventing axial separation of the end cap and the housing.

However, while the connection is not affected by spring back of the metal fingers, the degree of tightness of the connection will depend on the relative dimensions of the end cap and housing crimping portions. For this reason, such connections are used mostly with metal end plates. If the end plate thickness is too small or the fingers are too narrow then there will be a gap between the end plate and the finger giving a loose connection between the end plate and the housing. If the end plate is too thick or high and/or the fingers are too broad, then the crimping will not be successful, excess force may be applied damaging the motor or the fingers may be deformed leading to possible damage or mounting and handling problems, as well as possible clamping relaxation problems.

SUMMARY OF THE INVENTION

Thus there is a need for a method of connecting an end cap to a motor housing which will securely fix the end cap to the housing in a simple yet quick and effective manner.

This need is fulfilled by this invention by using locking tabs in the form of circumferentially extending fingers which are moved radially to clamp axially the end cap to the housing.

Accordingly, in one aspect thereof, the present invention provides a miniature electric motor comprising: a tubular housing; and at least one end cap, said end cap having a boss portion fitted inside the housing, a flange which abuts an axial end of the housing, and an engagement portion; said housing having at least one circumferentially extending finger which is radially deformed into contact with the engagement portion of the end cap to capture the end cap to the housing; wherein the engagement portion includes an axially projecting ridge and the finger bears axially onto the ridge to nip the end cap to the housing.

According to a second aspect thereof, the present invention provides a method of connecting an end cap to a tubular housing of a miniature electric motor, the method comprising the steps of providing an end cap with a flange portion, a boss portion and at least one engagement portion, providing a tubular housing with at least one circumferentially extending finger, inserting the boss portion of the end cap into the housing such that the flange abuts an axial end of the housing and the recess is aligned with the finger, and providing an axially projecting ridge on the engagement portion and deforming the finger radially so that an axially inner edge of the finger axially engages the ridge to prevent axial movement of the end cap with respect to the housing.

Preferably, the method also includes providing two pairs of said fingers and radially deforming each pair of fingers into a respective engagement portion of the end cap, each finger having an axially inner edge which extends at an incline to a plane orthogonal to an axis of the housing, the axially inner edge being brought into contact with an axially inner surface of the recess by radially deforming and continuing to radially deform the finger causing the inner edge of the finger to exert an axial force on the surface of the end cap to clamp the end cap to the housing.

BRIEF DESCRIPTION OF THE DRAWINGS

One preferred embodiment of the invention will now be described, by way of example only, in which.

DETAILED DESCRIPTION OF THE PREFERRED EMBODIMENT

Figure 1:
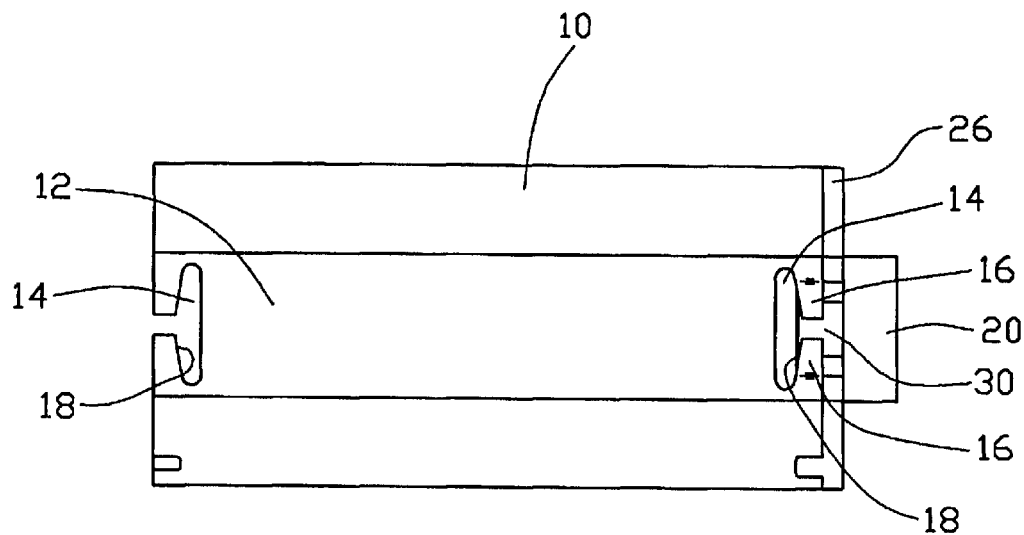
FIG. 1 illustrates a tubular housing for a miniature electric motor with an end cap fitted to one end in accordance with the present invention.
Figure 2:
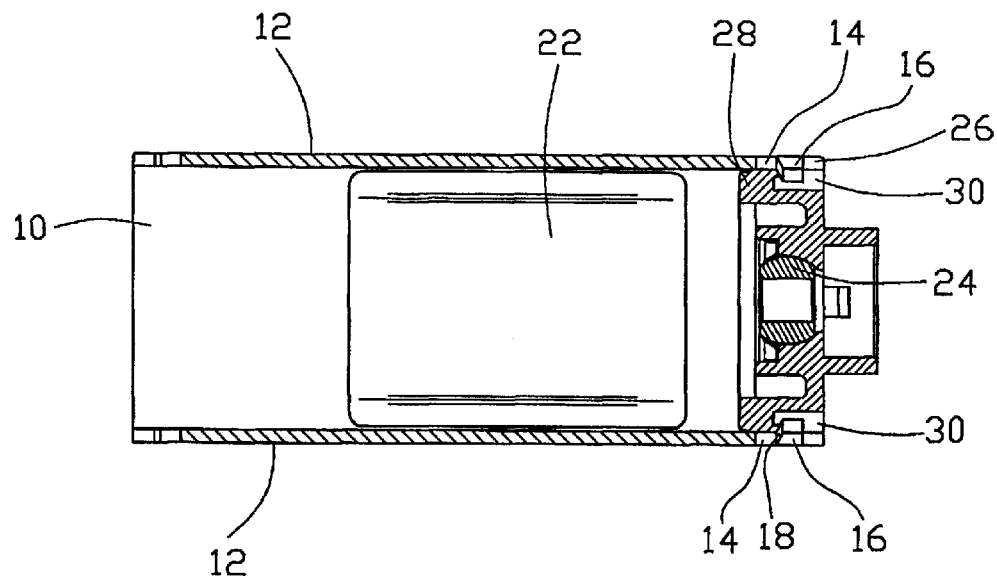
FIG. 2 is a cross-sectional view of the housing and end cap of FIG. 1.
Figure 3:
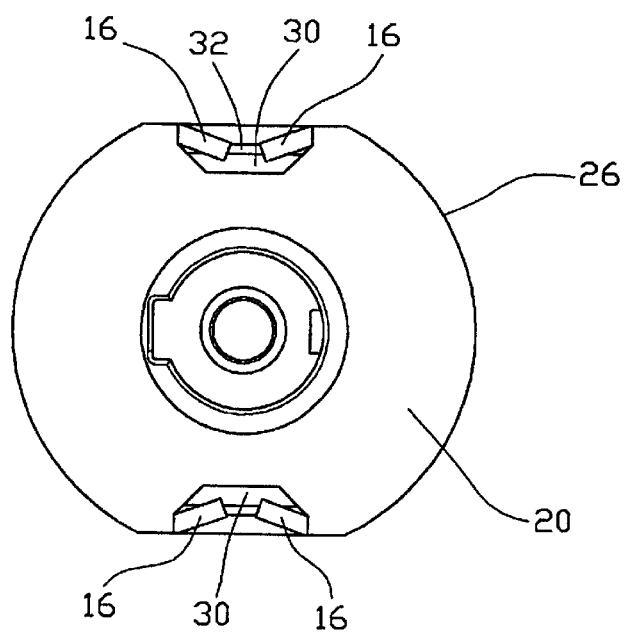
FIG. 3 is an end view of the housing and end cap of FIG. 1.
Figure 4:
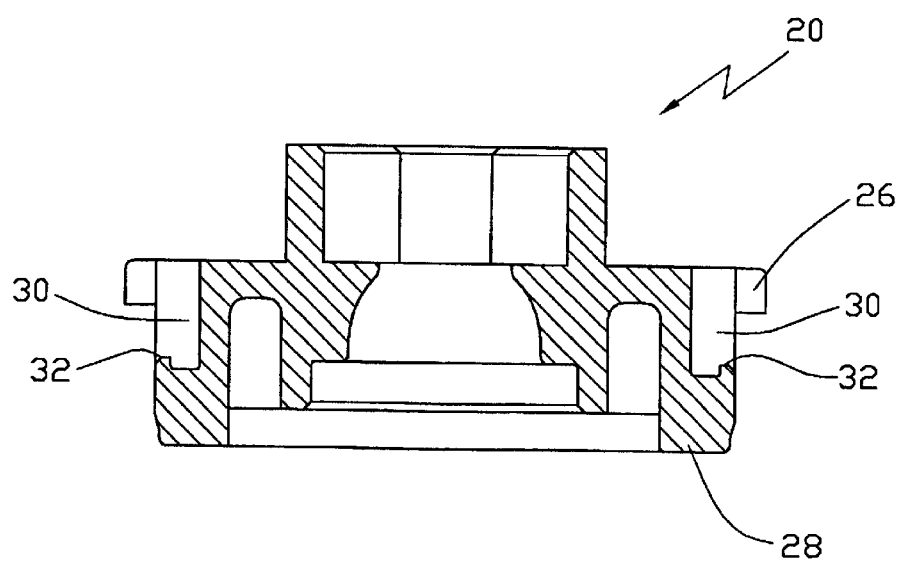
FIG. 4 is a cross-sectional view of the end cap of FIG. 1.

The housing 10 is a tubular body of electrical steel which may be rolled or deep drawn. The housing has a substantially circular cross-section with two flat sides 12. At each end of each flat side, a T-shaped hole 14 is formed producing a pair of circumferentially extending fingers 16. The fingers 16 have a tapered axially inner edge 18. These fingers 16 are used to secure an end cap 20 to the housing. As shown in FIG. 2, the housing 10 supports permanent magnets 22 forming the stator field for a motor.

While only one end cap is shown in the drawings, the housing illustrated would have an end cap at each end, one supporting a bearing (as shown in FIG. 2) and the other supporting a bearing and brush gear including motor terminals (not shown).

The end cap 20 has a flange 26 which sits on the end of the housing as well as a boss portion 28 which fits inside the housing 10 and extends axially beyond the T-shaped holes 14. Two recesses 30 in the flange 26 and boss 28 are aligned with the pairs of fingers 16 and the fingers 16 are radially deformed into the recesses to secure the end cap to the housing.

Each recess 30 has a circumferentially extending axially projecting outer lip or ridge 32 which is engaged by the fingers 16. Indeed, the fingers 16 may deform or partly destroy the ridge 32 when they are pressed into the recess 30. As the fingers engage the ridge, the tapered edge 18 of the fingers 16 apply an axial force pressing the end cap into tight contact with the housing. The more the fingers 16 are pressed radially, the greater the axial force applied to the end cap 20. Thus, even if there is slight springback of the fingers 16 in the radial direction, the axial clamping force will remain resulting in no loosening of the end cap.

The use of the ridge 32 allows for slight variation in axial alignment between the fingers 16 and the recesses 30 due to manufacturing tolerances, etc. without affecting the holding force. The ridge 32 can be readily sheared radially by the fingers 16 while providing a strong axial abutment, the area behind the ridge providing a debris collection zone whereby the sheared portion of the ridge does not interfere with the radial deformation of the fingers.

The embodiment shown uses a resin molded end cap which is preferred by some applications and the ridge in the recess for the locking fingers is easy to mold. However, end caps can be made from metal, either cast or stamped and such end caps can be formed with ridges in the engagement regions which are equivalent to recesses in the molded end caps. While it is acknowledged that resin can be sheared more easily than metal, particularly mild steel, the ridge can nevertheless be deformed to accommodate the locking fingers and can achieve a good clamping pressure or resiliency.

While the tapered locking fingers are preferred, to give increased compression or clamping force on the end cap, the ridge can be used with straight sided fingers to give satisfactory results by shearing or deforming the ridge. A chamfer on the ridge goes some way to increase the clamping force for a straight edged finger but is also beneficial for tapered fingers.

As such, the present invention provides a very effective yet simple method of securely clamping an end cap to a housing of an electric motor even when the housing has a relatively thick wall making axial crimping impractical.

While only one embodiment has been described, variations will be apparent to those skilled in the art and it is intended to cover all variations which fall within the scope of the invention as defined by the appended claims. In particular, although the fingers are shown formed in pairs, they could be formed individually. Also while two pairs of fingers are shown for holding one end cap, arrangements can be envisaged where there is only one finger or one pair of fingers is required to secure the end cap. Alternatively, three, four or more fingers or pairs of fingers could be used.

What is claimed is:

1. A miniature electric motor comprising
   a tubular housing; and
   at least one end cap, said end cap having a boss portion fitted inside the housing, a flange which abuts an axial end of the housing, and an engagement portion;
   said housing having at least one finger having a longitudinal axis extending in the circumferential direction which is radially deformed into contact with the engagement portion of the end cap to capture the end cap to the housing;
   wherein the engagement portion includes an axially projecting ridge and the finger bears axially onto the ridge to nip the end cap to the housing.

2. The motor of claim 1, wherein the ridge is substantially circumferentially extending along the engagement portion.

3. The motor of claim 1, wherein the engagement portion has a substantially planar portion lying in a radial plane of the motor from which the ridge projects axially away from the housing.

4. The motor of claim 1, wherein the end cap is a molded resin body and the engagement portion includes a recess formed in the flange and boss portion into which the finger is deformed.

5. The motor of claim 4, wherein the ridge is formed along the outer peripheral edge of the recess.

6. The motor of claim 1, wherein the ridge has an outer chamfer for guiding the finger.

7. The motor of claim 1, wherein the engagement between the ridge and the finger involves at least part shearing of the ridge to accept the finger.

8. The motor of claim 1, wherein the finger has an axially inner edge which engages the ridge, said inner edge is tapered with respect to a radial plane of the motor.

9. The motor of claim 1, wherein the housing has an even number of fingers formed as opposing pairs by T-shaped holes in an end portion of the housing.

10. The motor of claim 9, wherein the end cap has a number of engagement portion corresponding in number to the pairs of fingers and the or each engagement portion accommodates one pair of fingers.

11. A method of connecting an end cap to a tubular housing of a miniature electric motor, the method comprising the steps of
    providing an end cap with a flange, a boss portion and at least one engagement portion,
    providing a tubular housing with at least one finger, having a longitudinal axis extending in the circumferential direction,
    inserting the boss portion of the end cap into the housing such that the flange abuts an axial end of the housing and the engagement portion is aligned with the finger,
    and providing an axially projecting ridge on the engagement portion and deforming the finger radially so that an axially inner edge of the finger axially engages the ridge to prevent axial movement of the end cap with respect to the housing.

12. The method of claim 11, wherein a part of the ridge is sheared by the finger thereby firmly holding the end cap to the housing.

13. The method of claim 11, including the step of providing a tapered surface to the axially inner edge of the finger thus causing a greater axial holding force the more the finger is deformed radially.

14. The method of claim 11, including the steps of
    providing a plurality of pairs of said fingers and radially deforming each pair of fingers into a respective engagement portion of the end cap, each finger having an axially inner edge which extends at an incline to a plane orthogonal to an axis of the housing, the axially inner edge being brought into contact with an axially outer surface of the ridge by radially deforming and continuing to radially deform the finger causing the inner edge of the finger to exert an axial force on the ridge of the engagement portion to clamp the end cap to the housing.

15. The method of claim 11, further including:
    providing a recess in the engagement portion, the recess extending through the flange and into the boss portion;
    providing the ridge on an axially inner surface of the recess and extending the ridge along a radially outer peripheral edge of the recess; and
    deforming the finger radially into the recess and into axial engagement with the ridge, thereby shearing a part of the ridge.

* * * * *